(12) United States Patent
Meyer et al.

(10) Patent No.: US 9,772,047 B1
(45) Date of Patent: Sep. 26, 2017

(54) CROSS-WALL INDICATOR POST

(71) Applicant: Globe Fire Sprinkler Corporation, Standish, MI (US)

(72) Inventors: Stephen J. Meyer, Chester Springs, PA (US); Yoram Ringer, Providence, RI (US)

(73) Assignee: GLOBAL FIRE SPRINKLER CORPORATION, Standish, MI (US)

( * ) Notice: Subject to any disclaimer, the term of this patent is extended or adjusted under 35 U.S.C. 154(b) by 0 days.

(21) Appl. No.: 15/188,426

(22) Filed: Jun. 21, 2016

(51) Int. Cl.
| F16K 31/46 | (2006.01) |
| F16K 37/00 | (2006.01) |
| F16K 31/60 | (2006.01) |
| F16K 35/06 | (2006.01) |
| F16K 1/20 | (2006.01) |

(52) U.S. Cl.
CPC ............ *F16K 31/46* (2013.01); *F16K 1/2007* (2013.01); *F16K 31/60* (2013.01); *F16K 35/06* (2013.01); *F16K 37/0008* (2013.01)

(58) Field of Classification Search
CPC ........ F16K 1/2007; F16K 31/46; F16K 31/60; F16K 35/06; F16K 37/0008
USPC ............................ 116/277; 137/556; 251/293
See application file for complete search history.

(56) References Cited

U.S. PATENT DOCUMENTS

| 437,489 | A | * | 9/1890 | Giles | .................... | F16K 37/0008 |
| | | | | | | 116/277 |
| 951,927 | A | * | 3/1910 | Whitney | .............. | F16K 37/0008 |
| | | | | | | 116/277 |
| 1,491,077 | A | * | 4/1924 | Beerworth | .............. | F16K 31/60 |
| | | | | | | 251/293 |
| 3,693,647 | A | * | 9/1972 | Saar | .......................... | E03B 9/04 |
| | | | | | | 116/277 |
| 4,297,966 | A | * | 11/1981 | Liberman | ........... | F16K 37/0008 |
| | | | | | | 116/277 |
| 4,702,275 | A | * | 10/1987 | Ballun et al. | ............. | E03B 9/12 |
| | | | | | | 116/277 |

(Continued)

FOREIGN PATENT DOCUMENTS

| CN | 103174870 A | * | 6/2013 | ............. | F16K 31/46 |
| CN | 205745590 U | * | 11/2016 | ............. | F16K 31/46 |

(Continued)

*Primary Examiner* — R. A. Smith
(74) *Attorney, Agent, or Firm* — Panitch Schwarze Belisario & Nadel LLP

(57) ABSTRACT

A cross-wall indicator post is provided to control through a wall, open and closed configurations of a piping system control valve having a manual actuator with a valve-hand wheel. The indicator post includes a post body having a mounting flange to mount the post body to a wall separating the post body from the control valve. An operating stem extends through the post body and is adjustably, slidably, non-rotatably, telescopingly engaged with an extension rod. A post-hand wheel is engaged with the operating stem for rotation thereof. An engagement member is fixedly attached to the extension rod, configured to be selectively, mechanically engageable with, and releasable from, the valve-hand wheel to actuate the control valve between the open and closed configurations thereof. Rotation of the post-hand wheel rotates the operating stem, the extension rod, and the engagement member, to, in turn, rotate the valve-hand wheel.

17 Claims, 6 Drawing Sheets

(56) References Cited

U.S. PATENT DOCUMENTS

| | | | |
|---|---|---|---|
| 5,220,942 A * | 6/1993 | Garvin, Jr. et al. | F16K 37/0008 |
| | | | 116/277 |
| 5,295,503 A | 3/1994 | Meyer et al. | |
| 5,439,028 A | 8/1995 | Meyer et al. | |
| 6,364,285 B1 * | 4/2002 | Stinnett .................. | F16K 31/46 |
| | | | 251/293 |
| 6,959,914 B1 * | 11/2005 | Corral ..................... | E03C 1/021 |
| | | | 251/293 |
| 8,550,115 B2 * | 10/2013 | Emanuel et al. ......... | E03B 7/09 |
| | | | 137/360 |
| 2014/0360422 A1 * | 12/2014 | Liles et al. .......... | F16K 37/0058 |
| | | | 116/277 |
| 2015/0260309 A1 * | 9/2015 | Fitzgerald ............... | F16K 31/46 |
| | | | 251/213 |
| 2016/0252187 A1 * | 9/2016 | Roell ..................... | F16K 31/46 |
| | | | 137/15.18 |

FOREIGN PATENT DOCUMENTS

| | | | | |
|---|---|---|---|---|
| JP | 59155680 A | * | 9/1984 | ............ F16K 31/00 |
| JP | H0654977 U | * | 7/1994 | ............ F16K 31/46 |

\* cited by examiner

CROSS-WALL INDICATOR POST

BACKGROUND OF THE INVENTION

The present invention is generally directed to an indicator post, and, more particularly, to a cross-wall indicator post which may be employed for actuating and indicating the status of a water supply control valve.

Indicator posts are employed with water supply systems, such as, for example, those employed in commercial establishments, e.g., a commercial building, and also in fire sprinkler water supply systems to actuate control valves supplying water to such systems. They also provide a visual display of the status of the control valve as open or closed. The National Fire Protection Association (NFPA) requires that certain water supply control valves, such as, for example, the main water supply control valve of a fire sprinkler system, be openable and closeable from outside the establishment, e.g., by fire fighters, or at least from a different room within the establishment.

Conventional cross-wall indicator posts provide a mechanical connection with a water supply control valve located inside an establishment with a control hand wheel (or other actuating member) located at least in a different room, or outside the establishment. Conventional cross-wall indicator posts generally include a housing mounted to a wall on the outside of the establishment and a drive shaft extending through the housing and wall and into permanent, mechanical engagement with the water supply control valve. For example, conventional cross-wall indicators posts are generally bolted to, or otherwise fixedly engaged with, a rotatable flange and/or a lug on an actuator shaft of the control valve. One drawback of such indicator posts is that the water supply control valve can only be opened or closed from the hand wheel of the indicator post, remote from the control valve.

Accordingly, it would be advantageous to manufacture a cross-wall indicator post that is releasably, mechanically, interferingly engageable with the control valve. Accordingly, the indicator post is selectively engageable with the control valve, whereby actuation of the valve is achieved remotely from the valve via the indicator post actuation member, and the indicator post is selectively disengageable from the control valve, whereby actuating of the control valve is achieved from the valve itself.

BRIEF SUMMARY OF THE INVENTION

Briefly stated, one aspect of the present invention is directed to a cross-wall indicator post to control through a wall, open and closed configurations of a piping system control valve having a manual actuator with a valve-hand wheel. The indicator post comprises a post body having a mounting flange at a distal end of the post body to fixedly mount the post body to a first side of a wall separating the post body from the control valve. An operating stem extends entirely through the post body and beyond the mounting flange. A post-hand wheel is rotatably positioned adjacent a proximal end of the post body and engaged with a proximal end of the operating stem to rotate the operating stem. An extension rod has a first end and a second end, wherein the first end of the extension rod is in slidable telescoping engagement with a distal end of the operating stem to selectively adjust a combined length of the engaged operating stem and extension rod. The extension rod is non-rotatably attached to the operating stem such that rotation of the post-hand wheel also rotates the extension rod. An engagement member is fixedly attached to the second end of the extension rod such that rotation of the post-hand wheel also rotates the engagement member. The engagement member is configured to be selectively, mechanically engageable with, and releasable from, the valve-hand wheel to actuate the control valve between the open and closed configurations thereof. Upon mounting of the indicator post to the wall, (i) the post body and the post-hand wheel are located on the first side of the wall, (ii) the operating stem extends from the post-hand wheel on the first side of the wall, through the wall, and into a second, opposing side of the wall, (iii) the extension rod and the engaging member are located on the second side of the wall, and (iv) the combined length of the operating stem and the extension rod is selectively adjustable to selectively engage and disengage the engagement member with the valve-hand wheel, whereby the control valve can be selectively, manually operated by either of the valve-hand wheel and the post-hand wheel.

Another aspect of the present invention is directed to the aforementioned cross-wall indicator post, in combination with the piping system control valve. The control valve comprises the valve-hand wheel to manually actuate the control valve between the open and closed configurations.

Yet another aspect of the present invention is directed to a method of installing the aforementioned cross-wall indicator post. The method comprises the steps of (i) extending the distal end of the operating stem through an opening in the wall, from the first side of the wall to the second side of the wall; (ii) securing the mounting flange of the post body to the first side of the wall; (iii) sliding the first end of the extension rod into telescoping engagement with the distal end of the operating stem; and (iv) selectively adjusting the position of the extension rod with respect to the operating stem to releasably engage the engagement member with the valve-hand wheel, or to disengage the engagement member from the valve-hand wheel.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown diagrammatically in the drawings an embodiment of the cross-wall indicator post which is presently preferred. It should be understood, however, that the invention is not limited to the precise arrangements and instrumentalities shown.

DETAILED DESCRIPTION OF THE INVENTION

Figure 1:
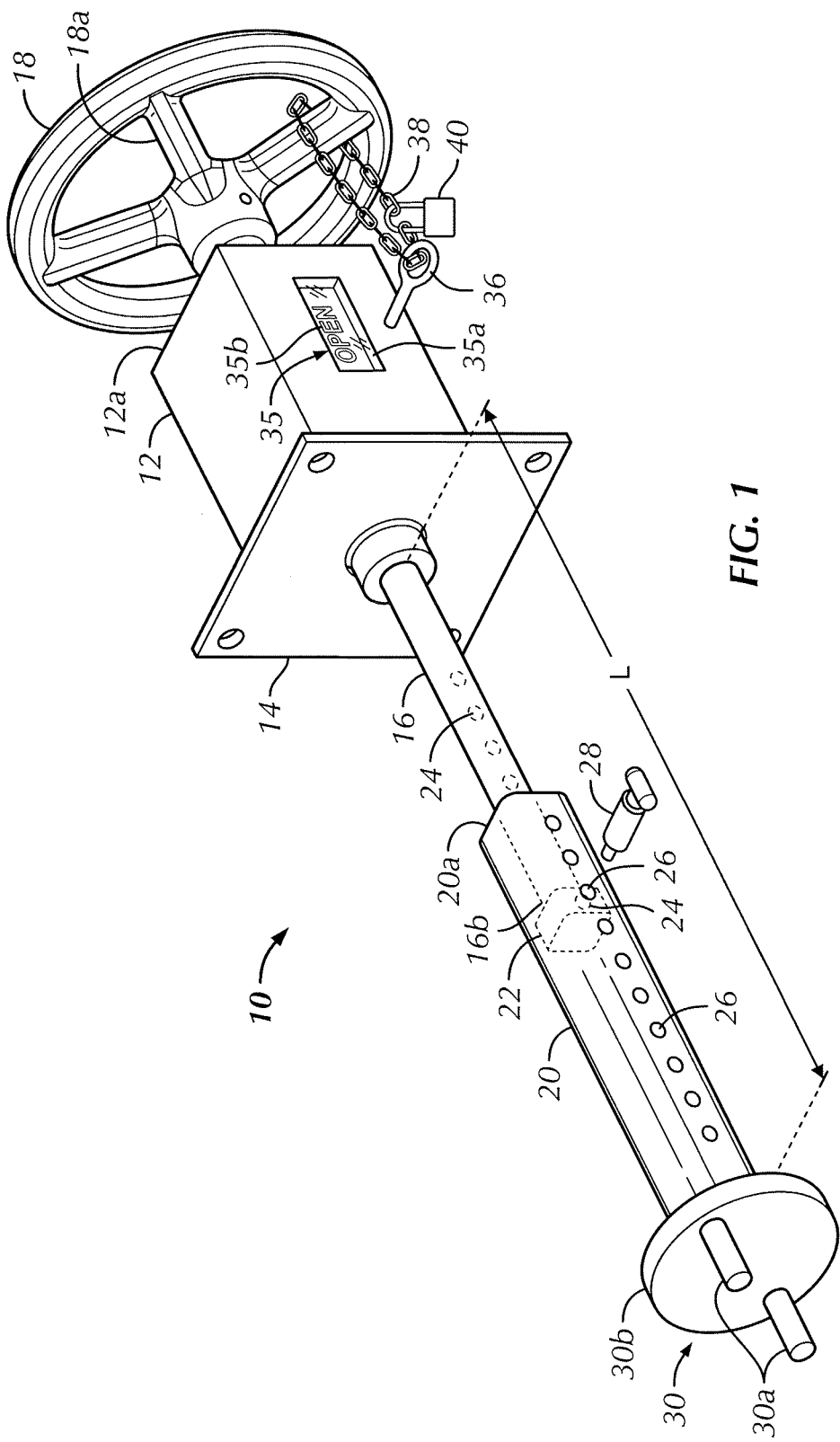
FIG. 1 is a perspective view of a cross-wall indicator post according to a preferred embodiment of the invention.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the indicator post, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be noted that the terms "first," "second," "third" and the like may be used herein to modify various elements. These modifiers do not imply a spatial, sequential, or hierarchical order to the modified elements unless specifically stated. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
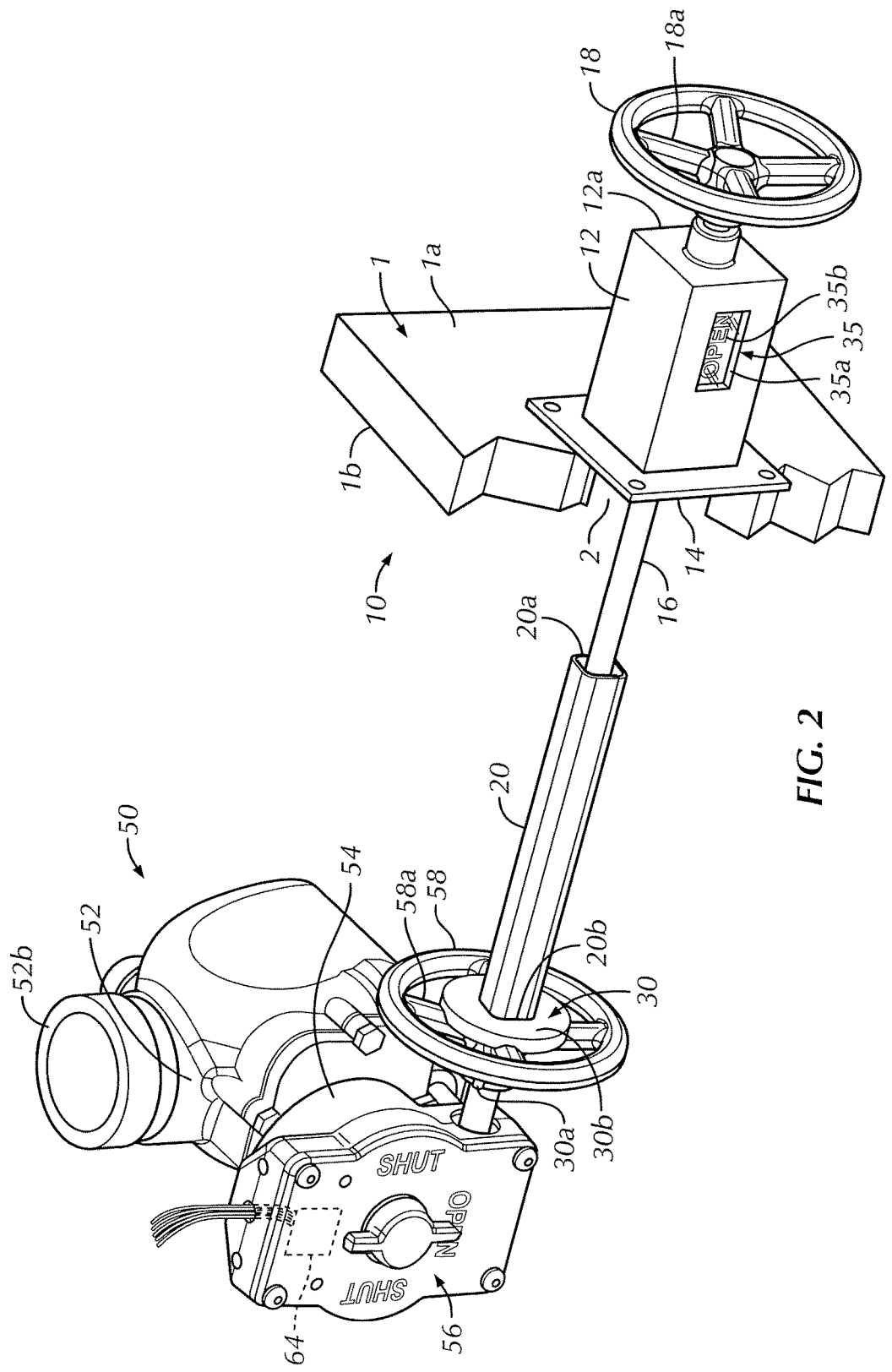
FIG. 2 is a perspective view of the cross-wall indicator post of FIG. 1, engaged with a piping system control valve having a valve-hand wheel.
Figure 3:
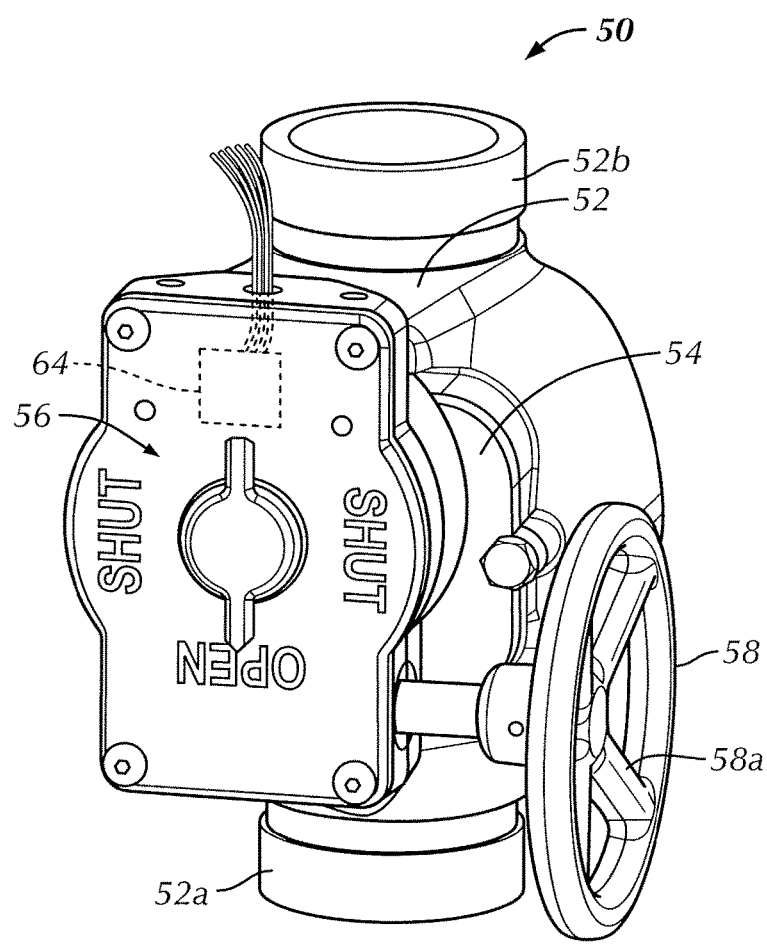
FIG. 3 is a front, perspective view of the control valve of FIG. 2, with which the indicator post of FIG. 1 can be used.
Figure 4:
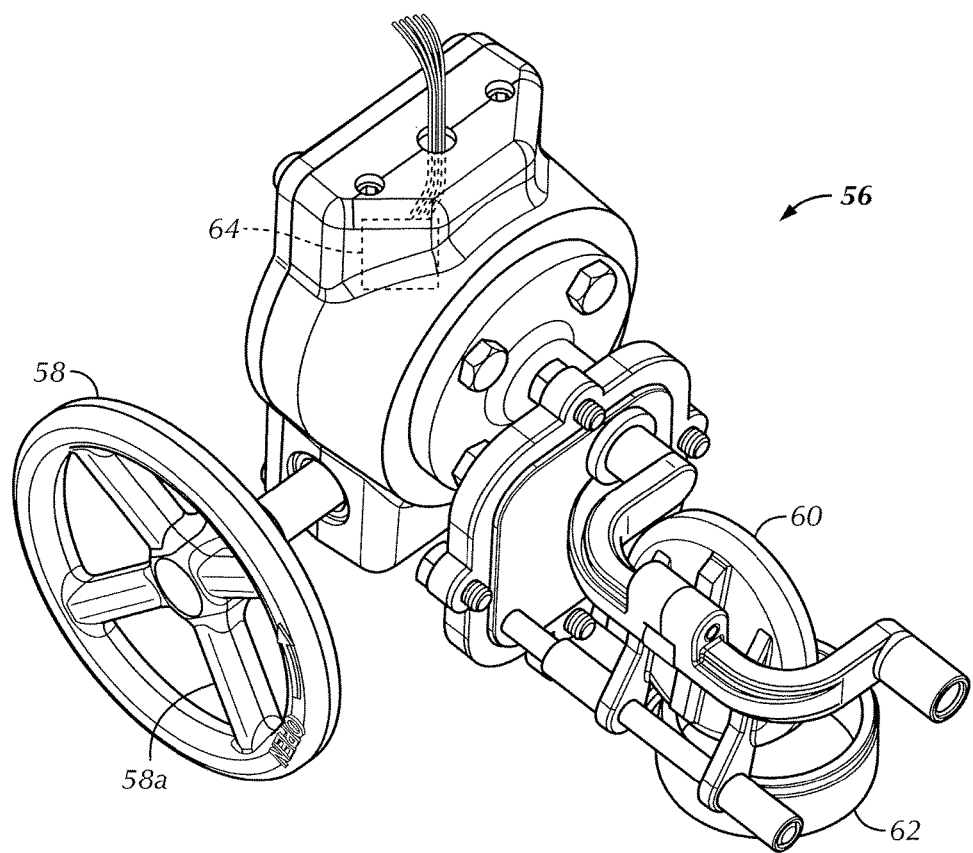
FIG. 4 is a perspective view of a valve actuation mechanism of the control valve of FIG. 3, with a clapper disk thereof in an open position.
Figure 5:
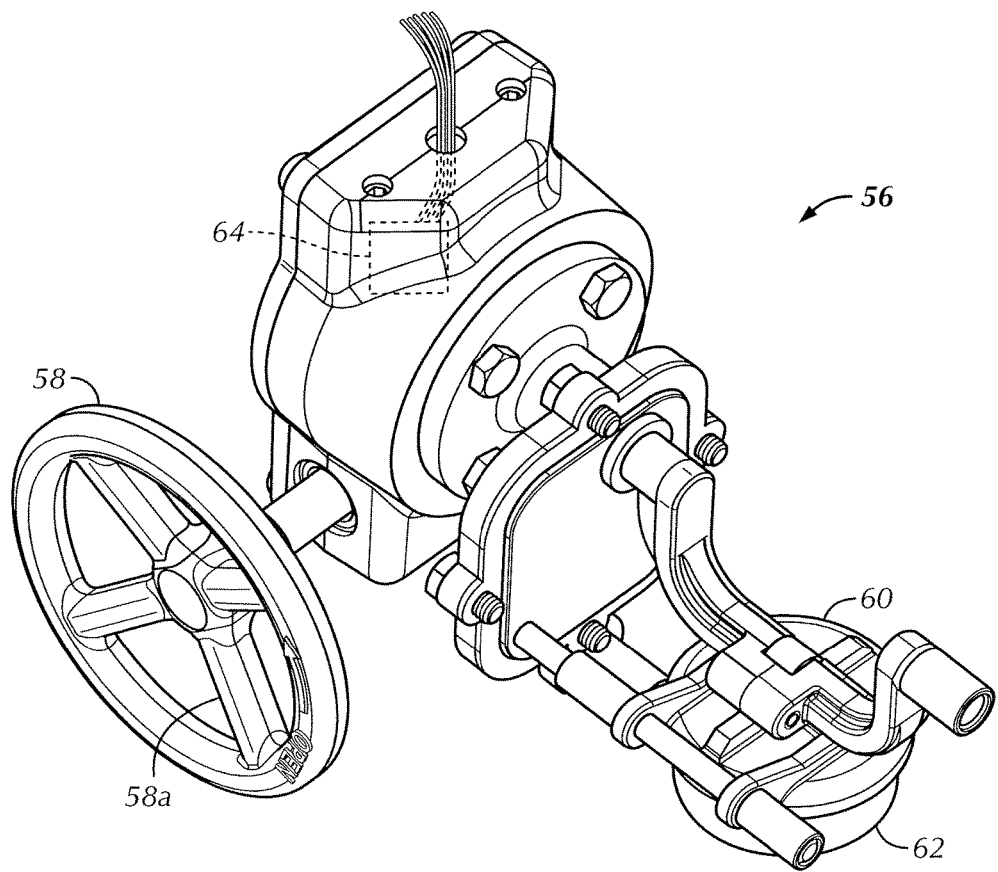
FIG. 5 is a perspective view of the valve actuation mechanism of FIG. 4, with the clapper disk in a closed position.

Referring to the drawings in detail, wherein like numerals indicate like elements throughout, there is shown in FIGS. 1-2 a cross-wall indicator post (hereinafter, "indicator post"), generally designated 10, in accordance with a preferred embodiment of the present invention. The indicator post 10 is configured to control open and closed configurations of a piping system control valve 50, such as, for example, without limitation, the control valve 50 shown in FIGS. 2-5. In the illustrated embodiment, as described below, the control valve 50 is a butterfly valve. The term "butterfly valve," as used herein, is sufficiently broad to cover any valve having a generally disk-shaped closure pivotable about an axis along a cross-section of a pipe to regulate fluid flow, including, for example, without limitation, a clapper valve. As should be understood by those of ordinary skill in the art, however, other types of control valves, currently known or that later become known, capable of performing the function of the control valve 50 described herein, may alternatively be employed and releasably engageable by the indicator post 10.

Referring to FIGS. 2-5, the control valve 50 includes a valve body 52 having an inlet end 52a and an opposing outlet end 52b for fluid communication with the piping system (not shown). In the illustrated embodiment, both ends 52a, 52b have respective outer peripheral grooves for mating in a conventional fashion with other fittings or pipe lengths. Alternatively, the ends could be threaded or flanged for other types of conventional mating. An opening 54 is provided in the sidewall of the valve body 52, and sealingly receives components of a valve actuation assembly indicated generally at 56 (shown best in FIGS. 4, 5).

The valve actuation assembly 56 includes a valve-hand wheel 58 operatively connected with a clapper 60. As shown, the valve-hand wheel 58 includes a plurality of spokes 58a. In an assembled configuration with the control valve 50, the valve-hand wheel 58 is located outside of the valve body 52, and the clapper 60 is positioned within the valve body 52. Clockwise and counterclockwise rotation of the valve-hand wheel 58 pivots the clapper 60 between open (FIG. 4) and closed (FIG. 5) configurations, corresponding to open and closed configurations of the control valve 50. As shown best in FIGS. 4 and 5, the valve body 52 includes an annular seat 62 to which the clapper 60 sealingly mates when pivoted into the closed configuration, to close the valve 50 and substantially prevent fluid flow therethrough, and from which the clapper 60 pivots away when pivoted into the open configuration, to open the valve 50 and permit fluid flow therethrough.

Optionally, the valve actuation assembly 56 may further include a conventional, commercially available, worm gear transmission (not-shown) between the valve-hand wheel 58 and the clapper 60, to provide a reduction ratio. As should be understood by those of ordinary skill in the art, control valves for fire protection systems are normally rated at 175 or 300 psi operating pressure. To obtain testing laboratory approvals for fire protection systems, the control valves are cycled repeatedly at twice the rated pressure for leakage, i.e., 350 or 600 psi. The seat of an eight inch valve, for example, has a surface area of slightly more than two hundred square inches. Six hundred psi for a three hundred psi rating imposes a load on two hundred square inches of about thirty-thousand pounds. Accordingly, a worm gear transmission provides the necessary mechanical advantage to manually open and close the control valve 50 under such conditions.

As should be understood by those of ordinary skill in the art, aside from closing the control valve 50 for maintenance purposes, the control valve 50 generally must be fully open at all times in order to ensure proper water flow in the event of an emergency. Accordingly, the control valve 50 is provided in a conventional fashion with one or more internal supervisory switches 64, i.e., a tamper evident switch, which operate(s) in a manner well understood by those of ordinary skill in the art, and which is attached to the control valve 50 in a conventional manner. As one example, without limitation, the supervisory/tamper switch 64 can be actuated by a cam (not shown), within the control valve 50, operatively connected to a valve stem (not shown) of the control valve 50 in a conventional fashion so as to change the state of the switch 64 within a predetermined number of turns of the valve-hand wheel 58. The supervisory switch 64 is also connected in a manner well understood by those of ordinary skill in the art to a monitoring system (not shown), which produces a warning signal to energize an alarm, turn on a light, or the like in the event an unauthorized person starts to open or close the control valve 50.

Turning to the indicator post 10, the indicator post 10 includes a post body 12 having a mounting flange 14 at a distal end thereof for fixedly mounting the post body 12 to a first side 1a of a wall 1 separating the post body 12 from the control valve 50 (FIG. 2). An operating stem 16 extends entirely through the post body 12 and beyond the mounting flange 14. A rotatable post-hand wheel 18 is positioned adjacent a proximal end 12a of the post body 12 and engaged with a proximal end of the operating stem 16 for rotating the operating stem 16. As shown, the post-hand wheel 18 includes spokes 18a. An extension rod 20 is slidably, telescopingly engaged with the operating stem 16 for selectively adjusting a combined length L of the engaged operating stem 16 and extension rod 20. As shown, all telescoping overlap between the extension rod 20 and the operating stem 16 is achieved distal of the mounting flange 14.

In the illustrated embodiment, the operating stem 16 is cylindrical and the extension rod 20 is rectangular in cross-section. The operating stem 16 includes a rectangular plate 22 at a distal end 16*b* thereof corresponding to the rectangular cross-section of the extension rod 20. The rectangular plate 22 of the operating stem 16 is slidably, non-rotatably received into a first end 20*a* of the extension rod 20, such that the extension rod 20 telescopes the operating stem 16. Accordingly, rotation of the post-hand wheel 18, which rotates the operating stem 16, also rotates the extension rod 20. As should be understood by those of ordinary skill in the art, however, the operating stem 16 may alternatively telescope the extension rod 20. As also should be understood, the operating stem 16 and the extension rod 20 may be telescopingly engaged and non-rotatable relative to one another via any of numerous alternative methods currently known or that later become known in the art.

As shown in FIGS. 1 and 2, the indicator post 10 further includes a removable lock 28 configured to selectively lock a position of the extension rod 20 relative to the operating stem 16 when a desired combined length L is achieved, and to selectively unlock the position of the extension rod 20 relative to the operating stem 16 to adjust the combined length L when required. In the illustrated embodiment, the operating stem 16 includes a plurality of spaced apertures 24 and the extension rod 20 also includes a plurality of spaced apertures 26, such as, for example, without limitation, a plurality of equally spaced apertures 26. The removable lock 28 of the illustrated embodiment takes the form of a spring loaded set pin to selectively engage one of the extension rod apertures 26 with one of the operating stem apertures 24 and selectively lock the position of the extension rod 20 relative to the operating stem 16 in a manner well understood by those of ordinary skill in the art. That is, the set pin 28 is manually retractable, against the spring bias thereof, out of two substantially overlapping apertures 24 and 26, to unlock the position of the extension rod 20 relative to the operating stem 16. When unlocked, the extension rod 20 is telescopingly slidable relative to the operating stem 16. Once the desired position of the extension rod 20 relative to the operating stem 16 is achieved, and an aperture 26 of the extension rod 20 substantially overlaps with an aperture 24 of the operating stem 16, the retracted set pin 28 is released and the spring bias returns the set pin 28 to project through both apertures 24, 26 and lock the position of the extension rod 20 relative to the operating stem 16, such that the extension rod 20 is not slidable relative to the operating stem 16. As should be understood, however, other locking mechanisms, currently known or that later become known, capable of performing the locking and unlocking functions of the removable lock 28 described herein may alternatively be employed, such as, for example, but not limited to, a ball detent or other conventional removable features, such as, but not limited to, a nut and bolt combination, a cotter pin, or the like.

Figure 6:
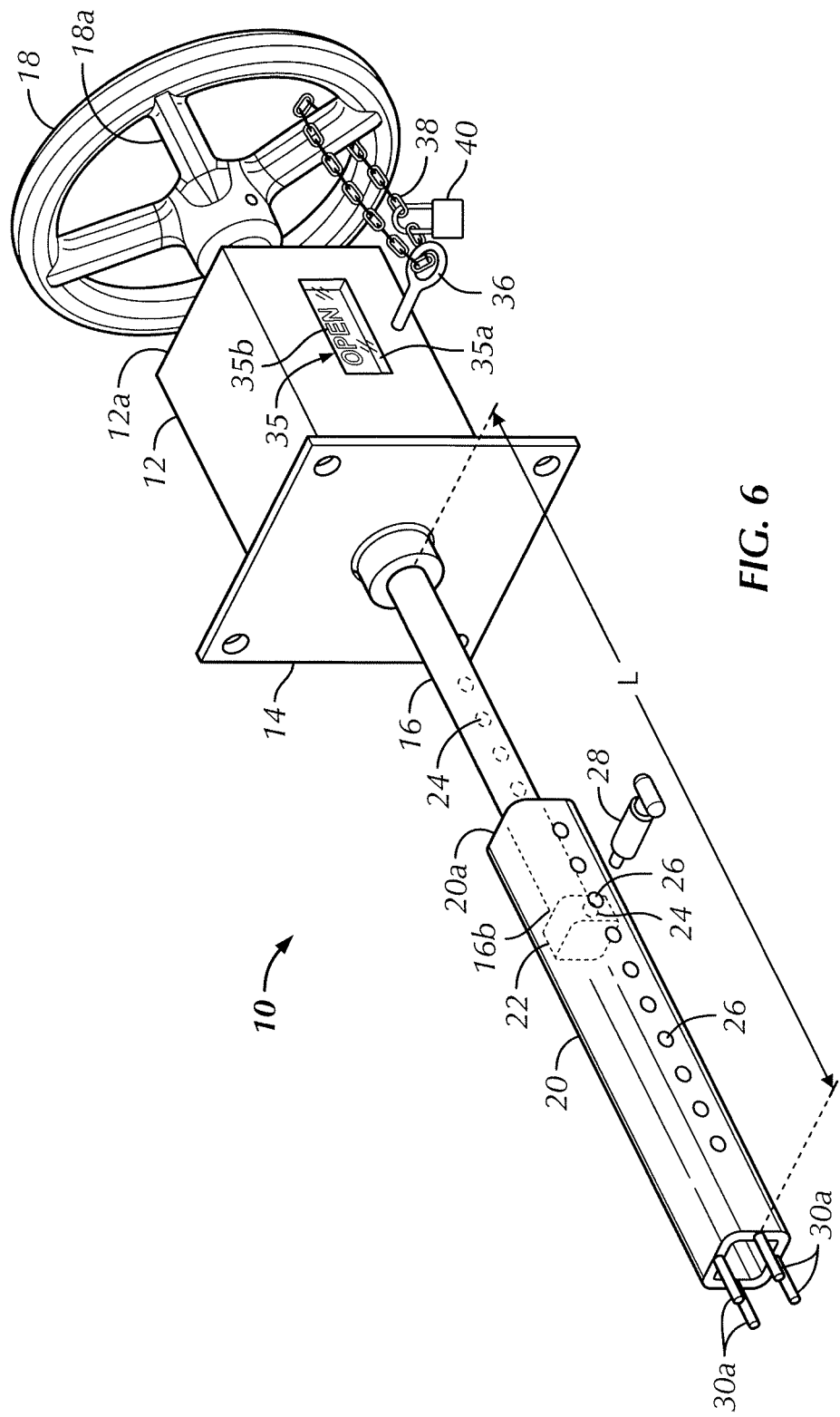
FIG. 6 is another perspective view of the cross-wall indicator post of FIG. 1, with the engagement member pins projecting directly from the extension rod 20.

Turning to an opposing second end 20*b* of the extension rod 20, an engagement member 30 is fixedly attached thereto, such that rotation of the post-hand wheel 18 also rotates the engagement member 30. The engagement member 30 includes at least one pin 30*a* projecting distally from the second end 20*b* of the extension rod 20, configured to be selectively, mechanically engageable with, and releasable from, the valve-hand wheel 58, e.g., engageable with the spokes 58*a*, to actuate the control valve 50 between the open and closed configurations thereof, as will be described in further detail below. In the illustrated embodiment, the engagement member 30 further includes a plate 30*b* secured to the second end 20*b* of the extension rod 20, oriented substantially perpendicularly thereto, and two pins 30*a* projecting distally from the plate 30*b*. As should be understood by those of ordinary skill in the art, however, between two and five pins 30*a* may be employed, e.g., uniformly angularly spaced about, and radially displaced from, the second end 20*b* of the extension rod 20. Also, the pins 30*a* may alternatively project directly from the second end 20*b* of the extension rod 20, without a plate 30*b*, displaced radially from the second end 20*b* of the extension rod 20 (FIG. 6).

The indicator post 10 further includes a conventional visual status indicator 35 to indicate the status of the control valve 50. In the illustrated embodiment, the visual status indicator 35 is located in the post body 12. The status indicator 35 includes an indicator window 35*a* in the post body 12. An OPEN logo 35*b* and a SHUT logo (not shown) are connected to, mounted on, or operated upon by the operating stem 16 within the post body 12. The visual status indicator 35 is configured such that the OPEN logo 35*b* aligns with the indicator window 35*a* when the control valve 50 is in the open configuration, and the SHUT logo aligns with the indicator window 35*a* when the control valve 50 is in the closed configuration, in a manner well understood by those of ordinary skill in the art. Alternatively, the post body 12 may include two indicator windows, wherein the OPEN logo 35*b* aligns with the indicator window 35*a* when the control valve 50 is in the open configuration, and the SHUT logo aligns with the other indicator window (not shown) when the control valve 50 is in the closed configuration.

As is also conventional, the post-hand wheel 18 is releasably secured to the post body 12 to prevent unauthorized users from changing the state of the control valve 50. In the illustrated embodiment, a post ring 36 projects from the post body 12 and a chain or cable 38 extending from a spoke 18*a* of the post-hand wheel 18 is connected to the post ring 36 via lock 40, in a conventional manner. The length of the chain 38 is selected to prevent the post-hand wheel 18 from sufficient rotation required to change the state of the control valve 50. An authorized user is capable of unlocking the lock 40 to disconnect the chain 38 from the post ring 36 and rotate the post-hand wheel 18, and reconnecting the chain 38 with the post ring 36 with the lock 40 thereafter.

To install, i.e., mount and assemble, the cross-wall indicator post 10, the distal end 16*b* of the operating stem 16 is extended through an opening 2 in the wall 1, from the first side of the wall 1*a* to an opposing second side of the wall 1*b*. The mounting flange 14 is secured to the first side of the wall 1*a* in a conventional manner known in the art, e.g., via anchor bolts. The first end 20*a* of the extension rod 20 is then slid into telescoping engagement with the distal end 16*b* of the operating stem 16.

Referring to FIG. 2, once the indicator post 10 is mounted to the wall 1, the post body 12 and the post-hand wheel 18 are located on the first side of the wall 1*a*. The operating stem 18 extends from the post-hand wheel 18 on the first side of the wall 1*a*, through the wall 1, and into the second, opposing side of the wall 1*b*. The extension rod 20 and the engaging member 30 are located on the second side of the wall 1*b*.

In use, the combined length L of the operating stem 16 and the extension rod 20 is selectively adjustable to selectively engage the engagement member 30 with the valve-hand wheel 58, whereby the control valve 50 can be selectively, manually operated by the post-hand wheel 18. Namely, an authorized user retracts the set pin or other removable lock 28 and adjusts the position of the extension rod 20 with respect to the operating stem 16 such that the pins 30a of the engagement member 30 engage some or all of the spokes 58a of the valve-hand wheel 58. Thereafter, the user releases the set pin or other removable lock 28 to return and project through substantially overlapping apertures 24, 26 and lock the position of the extension rod 20 relative to the operating stem 16, and, thus, lock the pins 30a in mechanical, interfering engagement with the spokes 58a. Thereafter, the user can rotate the post-hand wheel 18, thereby rotating the operating stem 16, the extension rod 20 and the pins 30, to, in turn, mechanically rotate the valve-hand wheel 58 via the pins 58a thereof and actuate the control valve 50 between the open and closed configurations.

An authorized user may also retract the set pin or other removable lock 28 from the apertures 24, 26, in order to re-adjust the position of the extension rod 20 with respect to the operating stem 16 to disengage the pins 30a from the valve-hand wheel 58. Thereafter, the user may rotate the valve-hand wheel 58 itself to actuate the control valve 50 between the open and closed configurations. Accordingly, one advantage of the indicator post 10 is that it provides the ability to control the control valve 50 from both the control valve 50 itself, e.g., inside a building, or from indicator post 10, e.g., outside a building. Another advantage of the indicator post 10 is that it no longer needs a supervisory switch, as the supervisory switch 64 is included with the control valve 50, since the control valve 50 can be manually operated from inside the building.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A cross-wall indicator post to control through a wall, open and closed configurations of a piping system control valve having a manual actuator with a valve-hand wheel including a ring supported by a plurality of spokes, the indicator post comprising:
   a post body having a mounting flange at a distal end of the post body to fixedly mount the post body to a first side of a wall separating the post body from the control valve;
   a visual status indicator located in the post body to indicate whether the control valve is open or shut;
   an operating stem extending entirely through the post body and beyond the mounting flange;
   a post-hand wheel rotatably positioned adjacent a proximal end of the post body and engaged with a proximal end of the operating stem to rotate the operating stem;
   an extension rod having a first end and a second end, the first end of the extension rod being in slidable telescoping engagement with a distal end of the operating stem to selectively adjust a combined length of the engaged operating stem and extension rod, the extension rod being non-rotatably attached to the operating stem such that rotation of the post-hand wheel also rotates the extension rod; and
   an engagement member fixedly attached to the second end of the extension rod such that rotation of the post-hand wheel also rotates the engagement member, the engagement member being configured to be selectively, mechanically engageable with, and releasable from, the spokes of the valve-hand wheel to actuate the control valve between the open and closed configurations thereof;
   wherein, upon mounting of the indicator post to the wall, (i) the post body and the post-hand wheel are located on the first side of the wall, (ii) the operating stem extends from the post-hand wheel on the first side of the wall, through the wall, and into a second, opposing side of the wall, (iii) the extension rod and the engaging member are located on the second side of the wall, and (iv) the combined length of the operating stem and the extension rod is selectively adjustable to selectively engage and disengage the engagement member with the valve-hand wheel whereby the control valve can be selectively, manually operated by either of the valve-hand wheel and the post-hand wheel.

2. The cross-wall indicator post of claim 1, wherein the operating stem is cylindrical and the extension rod is rectangular in cross-section, the operating stem having a rectangular plate at the distal end thereof corresponding to the rectangular cross-section of the extension rod, such that the operating stem is slidably, non-rotatably received into the first end of the extension rod and the extension rod telescopes the operating stem.

3. The cross-wall indicator post of claim 1, wherein the operating stem telescopes the extension rod.

4. The cross-wall indicator post of claim 1, wherein the engagement member comprises at least two pins projecting distally from the second end of the extension rod, and radially displaced therefrom.

5. The cross-wall indicator post of claim 4, wherein the engagement member further comprises a plate secured to the second end of the extension rod, the plate being oriented perpendicularly to the extension rod, and the at least one pin comprises a plurality of pins projecting distally from the plate.

6. The cross-wall indicator post of claim 1, wherein the engagement member comprises a plurality of pins radially displaced from, and uniformly angularly spaced about, the second end of the extension rod and projecting distally therefrom.

7. The cross-wall indicator post of claim 1, further comprising a removable lock configured to selectively lock and unlock a position of the telescoping extension rod relative to the operating stem.

8. The cross-wall indicator post of claim 7, wherein the operating stem includes a plurality of spaced apertures, the extension rod includes a plurality of spaced apertures, and the removable lock comprises a spring loaded set pin to selectively engage one of the extension rod apertures with one of the operating stem apertures and selectively lock the position of the extension rod relative to the operating stem.

9. The cross-wall indicator post of claim 1, wherein all telescoping overlap between the extension rod and the operating stem is distal of the mounting flange.

10. The cross-wall indicator post of claim 1, in combination with the piping system control valve, the control valve comprising the valve-hand wheel to manually actuate the control valve between the open and closed configurations.

11. The combination of claim 10, wherein the piping system control valve comprises a butterfly valve.

12. The combination of claim 11, wherein the butterfly valve is a clapper valve.

13. The combination of claim 10, wherein the piping system control valve includes a tamper switch and the cross-wall indicator post lacks a tamper switch.

14. A method of installing the cross-wall indicator post of claim 1, comprising the steps of:
- extending the distal end of the operating stem through an opening in the wall, from the first side of the wall to the second side of the wall;
- securing the mounting flange of the post body to the first side of the wall;
- sliding the first end of the extension rod into telescoping engagement with the distal end of the operating stem; and
- selectively adjusting the position of the extension rod with respect to the operating stem to releasably engage the engagement member with the valve-hand wheel, or to disengage the engagement member from the valve-hand wheel.

15. The method of claim 14, wherein the selectively adjusting step comprises selectively adjusting the position of the extension rod with respect to the operating stem to releasably engage the engagement member with the valve-hand wheel, and further comprising the step of rotating the post-hand wheel, thereby rotating the operating stem, the extension rod and the engagement member, to, in turn, rotate the valve-hand wheel and actuate the control valve between the open and closed configurations.

16. The method of claim 14, wherein the selectively adjusting step comprises selectively adjusting the position of the extension rod with respect to the operating stem to releasably engage the engagement member with the valve-hand wheel, and further comprising the step of selectively re-adjusting the position of the extension rod with respect to the operating stem to disengage the engagement member from the valve-hand wheel.

17. The method of claim 14, wherein the engagement member comprises a plurality of pins uniformly angularly spaced about the second end of the extension rod and projecting distally therefrom, and wherein the selectively adjusting step comprises selectively adjusting the position of the extension rod with respect to the operating stem to interferingly engage the plurality of pins with respective spokes of the valve-hand wheel.

\* \* \* \* \*